Oct. 27, 1970 J. E. BURNS 3,536,851
RESTRICTED TELEPHONE STATION SET
Filed Dec. 21, 1967
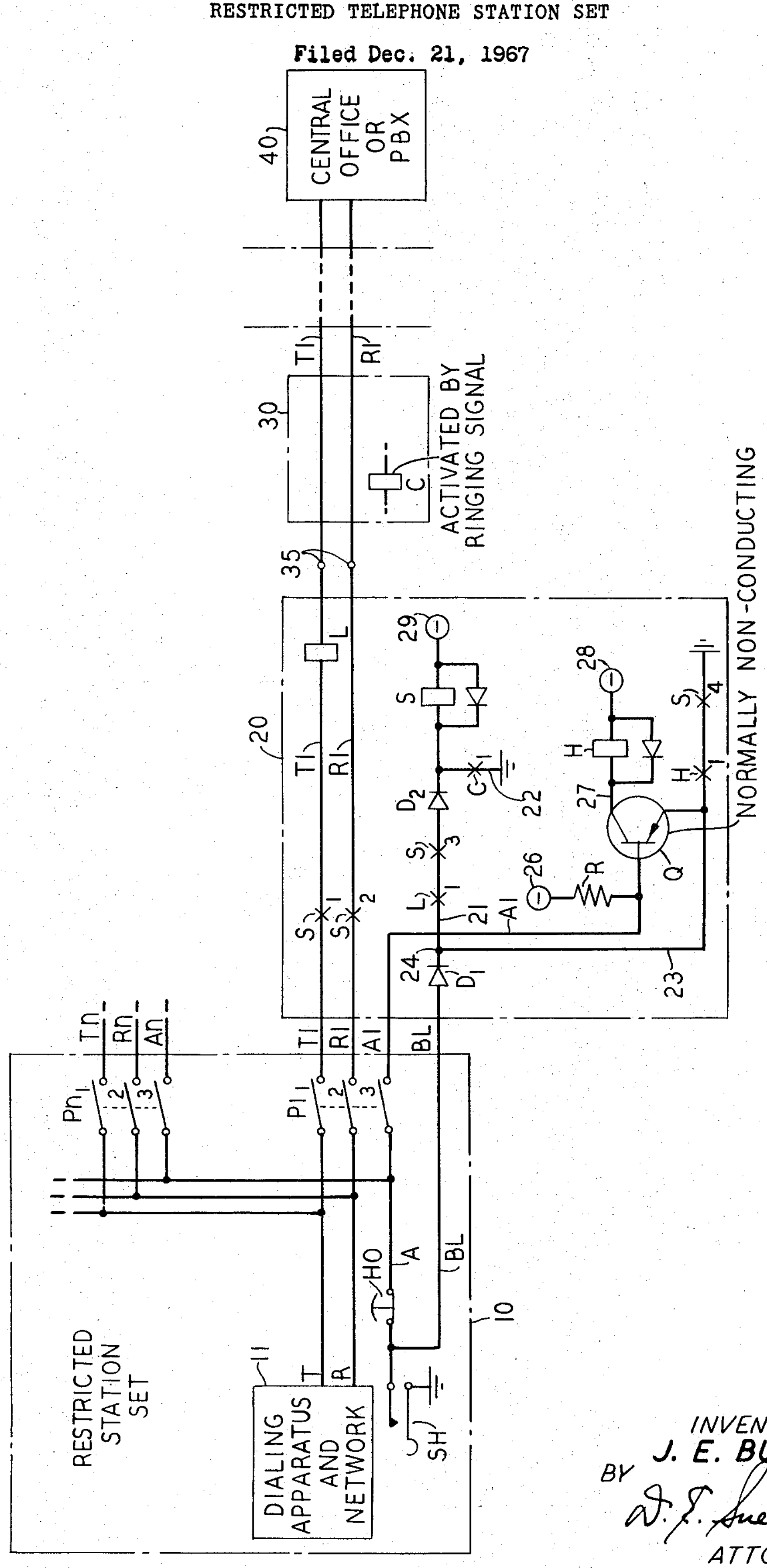
INVENTOR
J. E. BURNS
BY D. J. Snedeker
ATTORNEY United States Patent Office 3,536,851
Patented Oct. 27, 1970

3,536,851
RESTRICTED TELEPHONE STATION SET
James E. Burns, Eatontown, N.J., assignor to Bell Telephone Laboratories, Incorporated, Murray Hill, N.J., a corporation of New York
Filed Dec. 21, 1967, Ser. No. 692,398
Int. Cl. H04m 1/66
U.S. Cl. 179—81 10 Claims

ABSTRACT OF THE DISCLOSURE

In an arrangement for preventing calls from being originated at a telephone station set while permitting digital data to be sent with the station set dialing apparatus after a call has been received, make contacts of a relay operated by ringing and maintained by battery from the central office or PBX are included serially in the telephone line to isolate the station set except in response to an incoming call.

BACKGROUND OF THE INVENTION

This relates to telephone station sets and, more particularly, to a method and arrangement for restricting a station set to prevent calls being originated therefrom while permitting digital data to be set on an end-to-end basis after a call has been received.

In many situations the telephone subscriber wishes to prevent the party attending a particular telephone station set from gaining access to the telephone line except to answer incoming calls. The station set of a secretary or a receptionist, for example, may be restricted in this way to prevent outgoing calls. In the prior art this feature is often provided by completely disabling the dialing apparatus at the station set, thus preventing the attendant from dialing out.

This method of restricting a station set is entirely adequate so long as the set is used only to transmit voice signals. With the advent of digital data transmission by means of the telephone dialing apparatus, however, it is no longer acceptable in many situations to provide the restriction function by merely disabling the dialing apparatus.

Moreover, the above prior art restriction method does not permit a single line of a multiline key telephone station to be restricted so as to provide a partially restricted set. When restriction is provided by disabling the dialing apparatus, the station set must be either wholly restricted or wholly unrestricted.

Several arrangements for overcoming the shortcomings inherent in providing the restriction function by disabling the dialing apparatus have been proposed heretofore. Though satisfactory in operation, these arrangements, which use such devices as filters to provide the restriction function, are generally too complex and expensive to be practicable.

SUMMARY OF THE INVENTION

It is accordingly on object of this invention to provide a simple, compact and inexpensive arrangement for restricting a telephone station set so as to preclude calls from being originated therefrom while permitting digital data to be sent by means of the dialing apparatus upon the receipt of an incoming call.

It is a further object of this invention to provide an arrangement for so restricting one of a plurality of stations on a multistation line from originating calls without disabling the dialing apparatus of the one station.

It is yet another object of this invention to provide an arrangement for so restricting one of a plurality of telephone lines associated with a multiline station set, and to provide a "hold" feature for the restricted line.

In an illustrative telephone system in accordance with the principles of this invention a restricted station set is normally isolated from a line associated therewith by switching means, such as open isolation switch contacts, in the path connecting the set to the line. Incoming ringing signals on the line effect closure of the isolation switch contacts, connecting the set to the line. When the incoming call is answered, a lock-up path is established maintaining the isolation switch contacts closed after subsidence of the ringing current. At this point a party at the restricted station set may either converse with the calling party or transmit digital data to the calling station set, since in accordance with this invention the dialing apparatus at the restricted station set is not disabled or in any other way altered.

When either party goes on-hook, such as by returning his handset to its cradle, the isolation switch lock-up path is broken and the restricted station is disconnected from the line. If the party at the restricted station terminates the call by going on-hook, operation of the switch hook thereat opens the lock-up path, opening the isolation switch contacts to disconnect the set from the line. If the distant party hangs up, the interruption of the battery supply from the central office opens the lock-up path by means of a relay included serially in the telephone line.

In accordance with an aspect of this invention, if the "hold" key is depressed at the restricted station while the station is connected to the line, a separate lock-up path is established to maintain the isolation switch contacts closed even if the restricted station goes on-hook. As the "hold" key is released, the usual mechanical interlocking apparatus disconnects the set from the line without disturbing the closed condition of the isolation switch contacts. Voice conversation or transmission of digital data may be resumed subsequently over the line after the set is reconnected to the line in the normal manner, such as by operation of a line pickup key associated with the line.

The above and other objects and features of this invention may be fully comprehended from the following detailed description when considered with reference to the accompanying drawing, which shows an illustrative embodiment of a restricted station set in accordance with the principles of the present invention.

DETAILED DESCRIPTION OF THE INVENTION

In the drawing, restricted telephone station set 10 is connected via line conductors T1 and R1 through restriction circuit 20 and line circuit 30 to a central office or PBX designated 40. The illustrative embodiment of the present invention shown in the drawing is depicted in conjunction with a key telephone subscriber's line circuit of the general type disclosed and described in C. E. Morse-J. P. Smith Pat. 3,239,610, issued Mar. 8, 1966. However, it will be apparent from the discussion herein that the principles of the present invention may be employed advantageously in other known communication or telephone subscriber line circuits.

Restricted station set 10 includes dialing apparatus and network 11, which may include TOUCH-TONE or rotary dialing apparatus, connected via leads T and R through contacts 1 and 2, respectively, of line pickup switch P1 to line conductors T1 and R1. Lead A at station set 10 is connected to ground via a path through switch hook make contact SH and normally-closed hold contact HO. Lead A is connected by contact 3 of line pickup switch P1 over lead A1 to restriction circuit 20. Station set 10 is also linked to restriction circuit 20 via lead BL, which terminates in set 10 at a point on lead A between contacts SH and HO.

In the operation of station set 10, contacts 1, 2 and 3 of line pickup switch P1 are closed simultaneously by depressing a button or "pickup key" (not shown) typically located on the base unit of the station set. The normally closed hold contact HO is opened by depressing a nonlocking "hold key" (not shown) at the station set. The pickup key is linked with the hold key via the usual mechanical interlocking apparatus in such manner that release of the hold key releases the pickup key, opening contacts 1, 2 and 3 of pickup switch P1. Switch hook contact SH in station set 10 is closed typically by lifting the handset from its cradle to go off-hook.

Restricted station set 10 may also be connected to an additional telephone communication channel, indicated by line conductors T*n* and R*n* and lead A*n* in the drawing, by depressing a corresponding pickup key associated with line pickup switch P*n*. In accordance with one aspect of the present invention, the use of one or more additional telephone lines by station set 10 may be restricted or may advantageously be nonrestricted to permit station set 10 to initiate outgoing calls thereover in the usual manner. For nonrestricted use, line conductors T*n* and R*n* and lead A*n* would be connected directly to conventional line circuitry for extending the communication channel to central office or PBX 40. If, on the other hand, it is desired to restrict the use of this channel in the same manner as the channel comprising line conductors T1 and R1, restriction circuitry substantially similar to restriction circuit 20 is interconnected between the line circutiry and conductors T*n* and R*n* and lead A*n*, and lead BL is connected to the restriction circuitry for the line.

Restriction circuit 20 comprises an isolation relay switch S having a pair of make contacts 1 and 2 serially included in lines T1 and R1. In accordance with the usual form of relay notation contacts 1 and 2 of isolation relay S are hereinafter designated as isolation contacts S1 and S2, respectively. The remaining contacts of relay S and the contacts of relays H, L and C in the drawing are similarly designated by the corresponding relay designation and a numeral unique to the individual contact. Isolation relay switch S is operated via a path extending from source 29 through the winding of relay S and through make contact C1 over line 22 to ground. A lock-up path for relay S extends from line BL through diode D1 to point 24, through serially connected relay contacts L1 and S3 in line 21, and through diode D2 and the winding of relay S to source 29. Point 24 is connected over lead 23 through serially connected relay contacts H1 and S4 to ground to provide an alternate lock-up path for relay S. Lead A1 is connected to the base electrode of transistor Q and extends via lead A, which includes operate contact 3 of line pickup switch P1 and hold switch HO, to ground through switch hook contact SH. Transistor Q is thus normally biased nonconducting when set 10 is off-hook, hold switch HO is in the normally closed position, and switch P1 is operated. The emitter and collector electrodes of transistor Q are connected in the operate path for hold relay H, the collector being connected through the winding of relay H to source 28 and the emitter being connected over lead 23 to point 24. A lock-up path for hold relay H is provided by the path extending from the emitter of transistor Q to ground through contacts H1 and S4.

Line relay L in restriction circuit 20 is energized by battery from central office or PBX 40 on line conductor T1 in the manner described below when station set 10 goes off-hook and the appropriate pickup key is depressed to operate contacts 1, 2 and 3 of line-pickup switch P1.

Line circuit 30 is serially connected to line conductors T1 and R1 in conventional manner. Relay C in line circuit 30 is energized in conventional manner by ringing signals on line conductors T1 and R1 originating from central office or PBX 40 as described, for example, in the above-mentioned C. E. Morse-J. P. Smith patent.

Consider now the operation of the illustrative embodiment shown in the drawing. In the idle on-hook condition of station set 10, each of relays L, C, S, and H is deenergized and transistor Q is nonconducting. The subscriber at station set 10 cannot originate a call on line conductors T1 and R1, since open isolation switch contacts S1 and S2 included therein prevent him from transmitting dial signals to cenral office or PBX 40. Restricted station set 10 is accordingly inoperable with regard to originating outgoing calls over line conductors T1 and R1. Outgoing calls, however, can be originated from station set 10 in the usual manner over line conductors T*n* and R*n*.

Suppose another station wishes to call restricted station set 10 over line conductors T1 and R1. Ringing current is sent out by central office or PBX 40 on line conductors T1 and R1, energizing relay C in line circuit 30. Relay C operates to close contact C1, thereby energizing isolation relay S and closing isolation switch contacts S1 and S2. Restricted station set 10 is then connected over line conductors T1 and R1 to central office or PBX 40, and audible and visual signaling occurs in the usual manner indicating the presence of an incoming call on the particular line.

In customary fashion the subscriber at restricted station set 10 goes off-hook, closing switch hook contact SH, and manually depresses the appropriate pickup key to close contacts 1, 2, and 3 of pickup switch P1. When this occurs, as described above, battery supply from central office or PBX 40 on line conductor T1 activates line relay L in restriction circuit 20 via a path through operated contacts S1 and S2 and operated contacts 1 and 2 of switch P1 through network 11. At the same time the cessation of ringing on line conductors T1 and R1 deenergizes relay C, opening contact C1 in the operate path for relay S.

The opening of contact C1 does not, however, deenergize isolation relay S. Since relay L is energized in the above-described manner, a lock-up path is established for relay S, maintaining isolation switch contacts S1 and S2 closed. This lock-up path runs from source 29 to point 24 through the winding of relay S, closed switch contacts, diode D2 and L1 and S3, and over line BL through diode D1 and closed switch hook contact SH to ground in restricted station set 10.

Thus, with relays L and S energized, restricted station set 10 is in a stable busy state, and either voice signals or digital data may be transmitted outward to a distant station via line conductors T1 and R1.

The subscriber at station set 10 may place line conductors T1 and R1 in a "hold" condition while he places or receives a call on another communication channel, for example, the one represented in the drawing by line conductors T*n* and R*n*. To do this he manually depresses the hold key, opening hold switch contact HO in lead A. This removes ground from the base of transistor Q, and source 26 through resistor R renders transistor Q conducting. Current then flows through the operate path for hold relay H from ground in station set 10, through closed switch hook contact SH over lead BL, through diode D1 to point 24, over lead 23 through the emitter-collector path of transistor Q, and through the winding of hold relay H to source 28. Hold relay H, via operated contact H1 thereof, closes a lock-up path from the emitter of transistor Q through closed contact S4 to ground. Relay H thus remains energized even if the subscriber opens switch hook contact SH by going on-hook.

With hold relay H maintained in an energized state, an alternate lock-up path is established for isolation relay S which may be traced as follows: from source 29 through the winding of relay S, through diode D2, through operated contacts S3 and L1, point 24 and lead 23, and through operated contacts H1 and S4 to ground.

This alternate lock-up path for isolation relay S insures that isolation switch contacts S1 and S2 remain closed even if the first lock-up path for relay S traced above is interrupted by the opening of switch hook contact SH.

Since the hold key is nonlocking, it will return to its raised position when released, closing hold switch contact HO. As the hold key is released, the operation of the mechanical interlocking apparatus mentioned above releases the pickup key associated with pickup switch P1, opening contacts 1, 2, and 3 thereof and disconnecting station set 10 from its link with central office or PBX 40 over line conductors T1 and R1. Further, the opening contact 3 of pickup switch 1 as hold switch contact HO is closed prevents ground from being connected to the base of transistor Q and maintains transistor Q in a conducting state. As a result, relays H and S are maintained in an energized state.

With relays L, S and H energized and transistor Q conducting, line conductors T1 and R1 are in a "hold" condition. When the hold key is depressed, hold bridge circuitry (not show) internal to restricted station set 10 is connected to line conductors T1 and R1 in a manner well known in the telephone art to maintain a communication link with the distant station while contacts 1 and 2 of pickup switch P1 are open. The subscriber is thus free to depress the pickup key associated with another telephone line and connect station set 10 thereto. Referring to the drawing, the pickup key associated with line conductors T*n* and R*n* could be depressed, closing contacts 1, 2, and 3 of pickup switch P*n*. Restricted station set 10 would then be connected to the telephone line comprising line conductors T*n* and R*n*, and the subscriber could dial outward to central office or PBX 40, or receive an incoming call therefrom.

When the subscriber at station set 10 wishes to resume voice or data communication over line conductors T1 and R1, he depresses the pickup key associated with lines T1, R1 and A1, closing contacts 1, 2, and 3 of pickup switch P1. The connection of ground through closed switch hook contact SH and closed hold contact HO over lead A to the base of transistor Q switches transistor Q to the nonconducting state and opens the lock-up path for relay H, thereby de-energizing relay H. The system thus returns to the busy state described above with relays L and S activated.

If the distant party hangs up while station set 10 is busy, the central office battery supply over line conductors T1 and R1 is interrupted, and relay L is de-energized. Relay contact L1 opens, breaking the lock-up path for isolation relay S and opening relay contacts S1 and S2. With relays S, L, C and H de-energized and transistor Q nonconducting, the system is again in its idle condition. The subscriber at station set 10 is then restricted from calling out over line conductors T1 and R1.

If the subscriber at station set 10 hangs up while the station is in the busy condition, switch hook contact SH is opened and the lock-up path for isolation relay S is broken. Accordingly, isolation contacts S1 and S2 are opened and restricted station set 10 is prevented from gaining access to lines T1 and R1 for the purpose of originating a call thereon.

It is thus apparent that if either party hangs up while the system is busy, isolation switch contacts S1 and S2 are opened and restricted station set 10 is isolated again from line conductors T1 and R1. Since isolation relay S can be activated only by the presence of ringing energy on line conductors T1 and R1, it is impossible for the subscriber at restricted station set 10 to originate a call when the station is in the idle condition following hang-up by either party.

Additional restricted or nonrestricted stations may easily be associated with line conductors T1 and R1 by connecting corresponding leads thereof to appropriate points of restriction circuit 20 of the present system. For example, the communication channel line conductors of an additional nonrestricted station could be connected to line conductors T1 and R1 at respective points 35 between isolation switch contacts S1 and S2 and line circuit 30. Such an additional nonrestricted station would have full access to line conductors T1 and R1 for the purpose of receiving and placing calls. A plurality of such stations, with or without restrictive circuitry, could be connected in similar manner to line conductors T1 and R1 to form a multistation line having one or more restricted station sets.

It is to be understood that the above-described arrangements are but illustrative of the application of the principles of the present invention. Numerous other arrangements may be devised by those skilled in the art without departing from the spirit and scope of the invention.

What is claimed is:

1. A restricted communication system comprising a communication channel, a station set, central switching means for impressing ringing signals and battery voltage on said channel in response to an incoming call to said station set and for maintaining said battery voltage on said channel for the duration of said call, a line circuit including ringing signal detection means for detecting said ringing signals, battery voltage detection means for detecting said battery voltage, normally open contact means serially included in said channel, means responsive to said ringing signals detection means for closing said contact means and responsive to said battery voltage detection means for maintaining said contact means closed, and means for holding said communication channel.

2. A restricted communication system in accordance with claim 1 wherein said communication channel comprises a cable pair, said station set comprises means for connecting said station set across said cable pair, and said battery voltage detection means comprises a battery voltage detection relay winding included serially in one of said cable pair.

3. A restricted communication system in accordance with claim 2 wherein said ringing signals detection means comprises a ringing signals detection relay winding responsive to the presence of ringing current in said cable pair and said contact means comprises a pair of isolation contacts serially included in said cable pair.

4. A restricted communication system in accordance with claim 3 wherein said means for closing said contact means and for maintaining said contact means closed comprises a first conduction path including serially connected therein a normally open ringing signals contact responsive to said ringing signals detection relay winding and an isolation relay winding for closing said isolation contacts; and a second conduction path including serially connected therein said isolation relay winding, a normally open battery contact responsive to said battery voltage detection relay winding, and a switch hook contact.

5. A restricted communication system in accordance with claim 4 wherein said holding means comprises a hold relay winding; a third conduction path including serially connected therein said isolation relay winding, said battery contact and a hold contact responsive to said hold relay winding; and switching means for energizing said hold relay winding.

6. A restricted communication system in accordance with claim 5 wherein said switching means comprises a normally nonconducting transistor, a gate terminal associated therewith, and a manually operated hold switch connected to said gate terminal for biasing said transistor conducting to energize said hold relay winding.

7. A communication system including a subscriber's station set having an on-hook and an off-hook state, a subscriber's line associated with said station set, central switching means for applying ringing signals and battery voltage to said line in response to an incoming call to said station set, and a subscriber's line circuit connected to said line for detecting said ringing signals on said line, characterized by, means for restricting said subscriber's line to prevent outgoing calls from said station set on said line comprising, normally open switching means connected in circuit with said line and operative to connect said station to said line, means responsive to the detection of said ringing signals on said line for operating said switching means, means operative when said station is in said off-hook state for maintaining said switching means operated upon cessation of said ringing signals on said line, and means for returning said switching means to its normally open condition upon termination of said battery on said line.

8. A communication system in accordance with claim 7 further comprising an additional subscriber's line associated with said station set, line selection means for connecting said station set to said additional line, hold means for maintaining said switching means operated when said station set is connected to said additional line.

9. A communication system in accordance with claim 8 further comprising means including said hold means for maintaining said switching means operated when said station set is returned to said on-hook state.

10. A system for restricting at least one telephone station on a multistation telephone line from originating calls on said telephone line without precluding said one station from transmitting data or voice signals over said line upon the receipt of an incoming call, the system comprising said multistation telephone line; a plurality of telephone stations, including said one telephone station, connected to said multistation telephone line through individual conduction paths; means for maintaining said one station in isolation from said line so as to prevent access thereto for initiating an outgoing call; means for terminating said isolation from said telephone line upon the receipt of an incoming call; and means for returning said one station to said isolation at the termination of said incoming call.

References Cited

UNITED STATES PATENTS 1,812,984 7/1931 Richey ---------------- 179—81

KATHLEEN CLAFFY, Primary Examiner

W. A. HELVESTINE, Assistant Examiner

U.S. Cl. X.R.

179—189